(12) United States Patent
Morioka

(10) Patent No.: US 9,922,771 B2
(45) Date of Patent: Mar. 20, 2018

(54) ELECTROLYTIC CAPACITOR AND METHOD FOR MANUFACTURING SAME

(71) Applicant: Panasonic Intellectual Property Management Co., Ltd., Osaka (JP)

(72) Inventor: Ryo Morioka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 15/046,867

(22) Filed: Feb. 18, 2016

(65) Prior Publication Data

US 2016/0163465 A1 Jun. 9, 2016

Related U.S. Application Data

(63) Continuation of application No. PCT/JP2014/004097, filed on Aug. 6, 2014.

(30) Foreign Application Priority Data

Aug. 30, 2013 (JP) .................................. 2013-179891

(51) Int. Cl.
*H01G 9/028* (2006.01)
*H01G 9/15* (2006.01)
(Continued)

(52) U.S. Cl.
CPC .......... *H01G 9/028* (2013.01); *H01G 9/0032* (2013.01); *H01G 9/0036* (2013.01);
(Continued)

(58) Field of Classification Search
None
See application file for complete search history.

(56) References Cited

U.S. PATENT DOCUMENTS 5,461,537 A * 10/1995 Kobayashi ............. H01G 9/025
29/25.03
6,351,370 B1 * 2/2002 Konuma ................ H01G 9/025
252/500

(Continued)

FOREIGN PATENT DOCUMENTS

JP 62-029123 2/1987
JP 5-136007 6/1993
(Continued)

OTHER PUBLICATIONS

International Search Report of PCT application No. PCT/JP2014/004097 dated Oct. 7, 2014.

*Primary Examiner* — Dion R Ferguson
(74) *Attorney, Agent, or Firm* — McDermott Will & Emery LLP

(57) ABSTRACT

An electrolytic capacitor includes an anode, a dielectric layer formed on the anode, and an organic semiconductor layer covering at least a part of the dielectric layer. The organic semiconductor layer contains an organic semiconductor compound having a number average molecular weight of greater than or equal to 100 and less than or equal to 10,000 and a π electron cloud. In the organic semiconductor compound, a carrier moves between molecules of the organic semiconductor compound through the π electron cloud.

17 Claims, 3 Drawing Sheets

(51) Int. Cl.
  *H01G 9/00* (2006.01)
  *H01G 9/07* (2006.01)
  *H01G 9/042* (2006.01)

(52) U.S. Cl.
  CPC ............ *H01G 9/0425* (2013.01); *H01G 9/07* (2013.01); *H01G 9/15* (2013.01)

(56) References Cited

U.S. PATENT DOCUMENTS

| | | | |
|---|---|---|---|
| 6,430,033 B1 | 8/2002 | Mitsui et al. | |
| 6,790,384 B2* | 9/2004 | Konuma | H01G 9/025 252/500 |
| 6,807,049 B2* | 10/2004 | Konuma | H01G 9/025 252/500 |
| 8,164,884 B2* | 4/2012 | Nobuta | H01G 9/0036 29/25.03 |
| 2005/0212094 A1 | 9/2005 | Takagi et al. | |
| 2009/0224232 A1* | 9/2009 | Naito | H01G 9/012 257/40 |
| 2011/0171366 A1* | 7/2011 | Ning | H01G 9/0036 427/80 |
| 2011/0205690 A1* | 8/2011 | Komatsu | H01G 9/0036 361/525 |

FOREIGN PATENT DOCUMENTS

| | | |
|---|---|---|
| JP | 10-241998 | 9/1998 |
| JP | 2000-068152 | 3/2000 |
| JP | 2005-281410 | 10/2005 |
| JP | 2009-267287 | 11/2009 |
| JP | 2011-253878 | 12/2011 |

\* cited by examiner

ELECTROLYTIC CAPACITOR AND METHOD FOR MANUFACTURING SAME

BACKGROUND

1. Technical Field

The present disclosure relates to an electrolytic capacitor including a dielectric layer, and a method for manufacturing the same.

2. Description of the Related Art

Recently, a capacitor for high frequency and having a small size and large capacitance has been required according to reduction in the size and the weight of electronic devices. A solid electrolytic capacitor having small equivalent series resistance (ESR) and excellent frequency characteristics has been developed as such a capacitor. The solid electrolytic capacitor includes an anode formed of valve action metal such as tantalum, niobium, titanium, and aluminum, a dielectric layer formed on the surface of the anode, and a solid electrolyte layer formed on the surface of the dielectric layer.

Further, it is proposed that a conductive polymer layer is formed on the surface of the dielectric layer as a solid electrolyte layer. Examples of the method for forming a conductive polymer layer include a method in which a solution containing a monomer, a dopant, and an oxidant is applied onto a dielectric layer, and is subjected to chemical polymerization there, and a method in which a solution or a dispersion of a conductive polymer is applied onto a dielectric layer.

SUMMARY

An electrolytic capacitor according to an aspect of the present disclosure includes an anode, a dielectric layer formed on the anode, and an organic semiconductor layer covering at least a part of the dielectric layer. The organic semiconductor layer contains an organic semiconductor compound having a number average molecular weight in a range from 100 to 10,000, inclusive, and a π electron cloud. In the organic semiconductor compound, a carrier moves between the molecules of the organic semiconductor compound through the π electron cloud.

In a method for manufacturing an electrolytic capacitor according to an aspect of the present disclosure, first, an anode including a dielectric layer is prepared. A solution in which an organic semiconductor compound having a number average molecular weight in a range from 100 to 10,000, inclusive, and a π electron cloud is dissolved is applied onto the surface of the dielectric layer. Thus, an organic semiconductor layer covering at least a part of the surface of the dielectric layer is formed.

In a method for manufacturing an electrolytic capacitor according to another aspect of the present disclosure, first, an anode including a dielectric layer is prepared. A solution in which a precursor of an organic semiconductor compound having a number average molecular weight in a range from 100 to 10,000, inclusive, and a π electron cloud is dissolved is applied onto the surface of the dielectric layer. Then, an organic semiconductor compound is generated from the precursor so as to form an organic semiconductor layer covering at least a part of the surface of the dielectric layer.

According to the present disclosure, it is possible to increase capacitance of the electrolytic capacitor including a dielectric layer.

DETAILED DESCRIPTION OF PREFERRED EMBODIMENTS

Prior to describing embodiments of the present disclosure, problems of the electrolytic capacitor of the related art will be briefly described. In the method of the related art in which a conductive polymer layer is formed on the surface of a dielectric layer of the electrolytic capacitor, the dielectric layer is not able to be sufficiently covered with the conductive polymer layer, and thus, it is difficult to sufficiently increase capacitance (electrostatic capacity).

Hereinafter, various embodiments of the present disclosure will be described with reference to the drawings.

First Exemplary Embodiment

Figure 1:
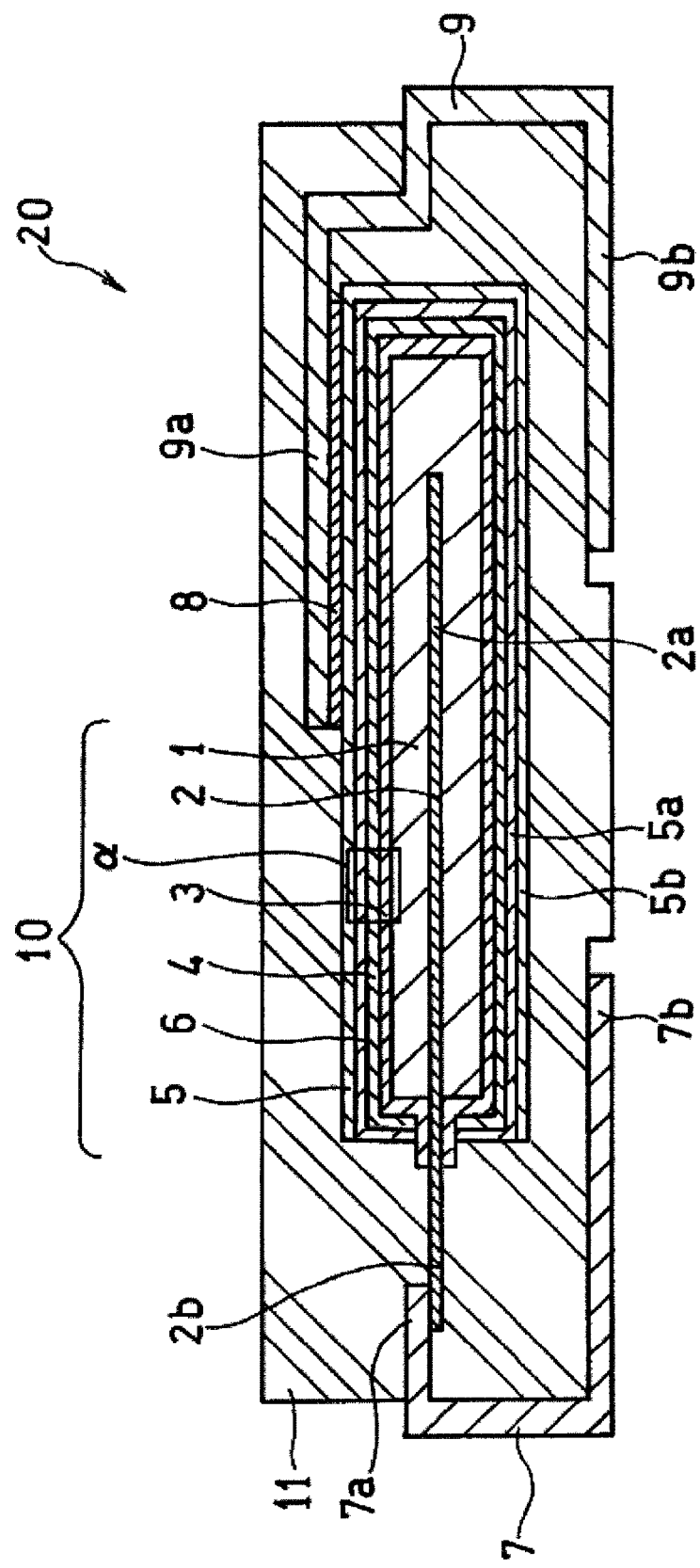
FIG. 1 is a schematic sectional view of an electrolytic capacitor according to an embodiment of the present disclosure.
Figure 2:
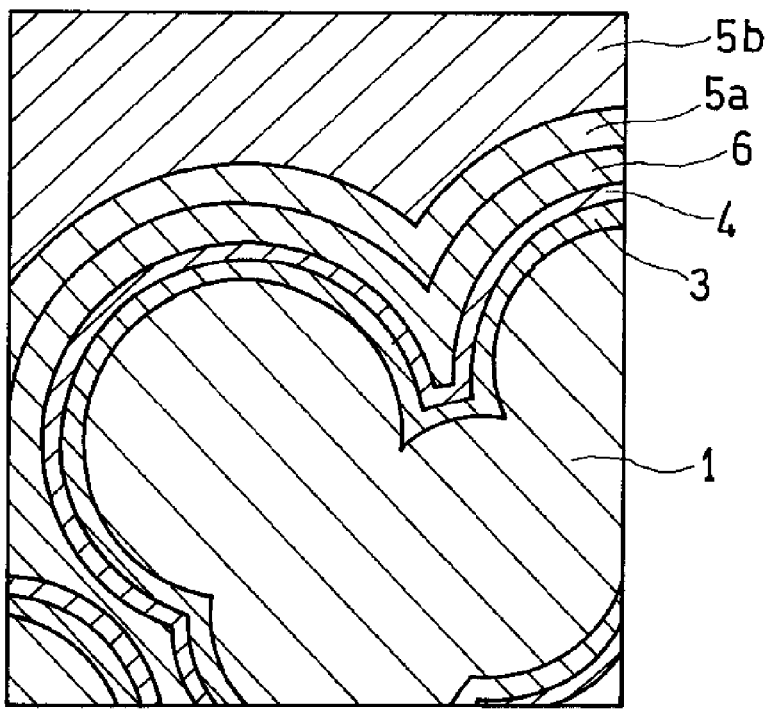
FIG. 2 is an enlarged view of a region surrounded by a solid line a in FIG. 1.

An electrolytic capacitor according to an embodiment of the present disclosure will be described with reference to FIG. 1 and FIG. 2. FIG. 1 is a schematic sectional view of solid electrolytic capacitor (hereinafter, a capacitor) 20 according to this embodiment.

Electrolytic Capacitor

Capacitor 20 includes capacitor element 10 having an approximately rectangular parallelepiped outer shape, resin exterior body 11 sealing capacitor element 10, and anode terminal 7 and cathode terminal 9 which are exposed to the outside of resin exterior body 11. Capacitor 20 has an approximately rectangular parallelepiped outer shape, like capacitor element 10.

Capacitor element 10 includes anode 1, anode lead 2, dielectric layer 3, organic semiconductor layer 4, and cathode layer 5. Anode 1 has an approximately rectangular parallelepiped shape. Anode lead 2 has first end portion 2a embedded in positive electrode 1, and second end portion 2b taken out from anode 1. Dielectric layer 3 covers the surface of anode 1. Organic semiconductor layer 4 covers at least a part of dielectric layer 3. Cathode layer 5 covers the surface of organic semiconductor layer 4. Further, capacitor element 10 may include conductive polymer layer 6 covering at least a part of dielectric layer 3 or at least a part of organic semiconductor layer 4. Meanwhile, FIG. 1 and FIG. 2 illustrate a case where a porous body is used as anode 1. In addition, FIG. 1 schematically illustrates dielectric layer 3, organic semiconductor layer 4, and conductive polymer layer 6 which are formed on an outer circumferential portion side of anode 1, and the details of the inside of anode 1 are omitted.

Second end portion 2b of anode lead 2 is electrically connected, by welding or the like, to first end portion 7a of anode terminal 7 which is sealed with resin exterior body 11.

On the other hand, cathode layer 5 is electrically connected, through conductive adhesive material 8 (for example, a mixture of a thermosetting resin and metal particles), to first end portion 9a of cathode terminal 9 which is sealed with resin exterior body 11. Second end portion 7b of anode terminal 7 and second end portion 9b of cathode terminal 9 are taken out from different side surfaces of resin exterior body 11, and extend to a main flat surface (a lower surface in FIG. 1) in an exposed state. An exposed portion of each of the terminals on the flat surface is used in solder connection or the like with respect to a circuit board (not illustrated) on which capacitor 20 is to be mounted.

The capacitor element used in this embodiment will be described in detail with reference to FIG. 2.

Anode

In this embodiment, anode 1 is a porous body of particles of valve action metal. Anode lead 2 is formed of a wire having conductivity, for example. Anode 1 is prepared by embedding first end portion 2a of anode lead 2 in particles of valve action metal or an alloy containing the valve action metal, followed by molding the metal particles into the shape of a rectangular parallelepiped in this embedded state, and sintering the molded body, for example. That is, anode 1 is a bonded body (a sintered body) of particles of valve action metal or an alloy containing the valve action metal. Accordingly, second end portion 2b of anode lead 2 is taken out from the outer circumferential surface of anode 1 such that second end portion 2b is erected.

In addition, anode 1 may be formed of foil of valve action metal or an alloy containing the valve action metal. The foil is roughened by an etching treatment or the like in order to enlarge the surface area thereof.

The same or a different material is used in a conductive material configuring anode 1 and anode lead 2. Valve action metal such as titanium (Ti), tantalum (Ta), aluminum (Al), and niobium (Nb) is used as the conductive material. An oxide of the metals has high dielectric permittivity, and thus, is preferable as a configuration material of anode 1. Furthermore, the conductive material may be an alloy formed of two or more types of metals. For example, an alloy containing valve action metal, silicon, vanadium, boron, and the like can be used. In addition, a compound containing valve action metal and a representative element such as nitrogen may be used. Furthermore, in this embodiment, an alloy of valve action metal contains the valve action metal as a main component, and it is preferable that the valve action metal is contained in an amount of 50 atom % or greater. In addition, anode 1 and anode lead 2 may be formed of conductive materials which are different from each other.

Dielectric Layer

Dielectric layer 3 can be formed as an oxide film by oxidizing the surface of the conductive material configuring anode 1. Accordingly, dielectric layer 3 is uniformly formed along the surface (including an inner wall surface of a pore or an etching pit) of the porous body or the foil configuring anode 1. The thickness of dielectric layer 3, for example, is 10 nm to 200 nm.

Organic Semiconductor Layer

Organic semiconductor layer 4 is so formed as to cover the surface of dielectric layer 3. Specifically, organic semiconductor layer 4 is formed along the surface including recessed portions (the inner wall surfaces of the pores or the etching pits) derived from the porous body or the foil configuring anode 1.

In the electrolytic capacitor of the related art, for example, a raw material monomer is chemically polymerized on the dielectric layer, and thus, the conductive polymer layer is formed. In this case, it is considered that the raw material monomer is polymerized to block the pore or the etching pit and forms a film before the raw material monomer is put into the inner wall surface of the pore or the etching pit and is polymerized. Accordingly, it is not possible to cover the surface of the dielectric layer formed on the inner wall surface of the pore or the etching pit with the conductive polymer layer, and it is not possible to obtain large capacitance. In addition, an unreacted raw material monomer remains on the dielectric layer, and thus, reliability of the electrolytic capacitor is likely deteriorated as a result such as an increase in equivalent series resistance (ESR) of the electrolytic capacitor.

As the other example of method of forming the conductive polymer layer, a method of applying a solution of a conductive polymer onto the dielectric layer can be employed. However, the conductive polymer has large molecules, and generally has a rigid molecular framework. In addition, the conductive polymer is dissolved in the solution such that molecular chains are tangled, and thus, viscosity of the solution easily increases. Accordingly, the conductive polymer cannot be sufficiently put into the pore or the etching pit.

In addition, the conductive polymer layer is also formed by applying a dispersion including particles of a conductive polymer onto the dielectric layer. However, the particles of the conductive polymer are large, and thus, the particles cannot be sufficiently put into the pore or the etching pit.

Thus, even when any of the methods described above is used, the conductive polymer layer cannot be uniformly formed up to a fine portion of the dielectric layer including the inner wall surface of the pore or the etching pit, and it is difficult to obtain sufficiently large capacitance.

Organic semiconductor layer 4 contains a low molecular organic semiconductor compound having a number average molecular weight in a range from 100 to 10,000, inclusive. When the number average molecular weight of the low molecular organic semiconductor compound is less than 100, it is difficult to obtain a molecular structure in which carriers can move between the molecules of the low molecular organic semiconductor compound through a π electron cloud included in the low molecular organic semiconductor compound itself. When the number average molecular weight of the low molecular organic semiconductor compound is greater than 10,000, it is difficult to put the low molecular organic semiconductor compound into the inner wall surface of the pore or the etching pit derived from the anode, and thus, it is not possible to increase capacitance. It is preferable that the number average molecular weight of the low molecular organic semiconductor compound is in a range from 100 to 2,000, inclusive.

The low molecular organic semiconductor compound has a low molecular weight, thus, has a short molecular chain and is easily put into the inner portion of the pore or the etching pit of dielectric layer 3, and it is possible to form organic semiconductor layer 4 on dielectric layer 3 on the inner wall surface of the pore or the etching pit. Accordingly, an electrolytic capacitor to be obtained has an improved capacitance appearance rate, and thus, it is possible to obtain large capacitance. In addition, the solution in which the low molecular organic semiconductor compound is dissolved has low viscosity, and thus, the solution can easily reach the inner portion of the pore or the etching pit. Accordingly, organic semiconductor layer 4 is easily formed on dielectric layer 3 on the inner wall surface of the pore or the etching pit.

In addition, the low molecular organic semiconductor compound has a low molecular weight as described above, and thus, is easily dissolved in the solvent. Therefore, introducing a substituent group such as an alkyl chain is hardly necessary in order to dissolve a conductive polymer in the solvent as in a case where the conductive polymer is used. The introduced substituent group blocks packing between the molecules, and thus, crystallinity easily becomes low and carrier mobility tends to be low. In contrast, the low molecular organic semiconductor compound has a short molecular chain and is an even aggregate of molecules, and thus, packing between the molecules is dense, and crystallinity is high. As a result, carrier mobility is improved.

Further, the electrolytic capacitor including organic semiconductor layer 4 on dielectric layer 3 is rarely affected by the raw material monomer which remains after a polymerization reaction for forming conductive polymer layer 6. Accordingly, reliability of the electrolytic capacitor is improved.

The low molecular organic semiconductor compound has a π electron cloud. Carriers move through the π electron cloud not only in the molecules of the low molecular organic semiconductor compound but also between the molecules of the low molecular organic semiconductor compound, and thus, organic semiconductor layer 4 exhibits semiconductor properties.

In the related art, a 7,7,8,8-tetracyanoquinodimethane (TCNQ) complex salt has been known as the material of an organic semiconductor layer having a low molecular weight. The TCNQ complex salt is formed of one molecule of a salt which is formed of a cation such as tetrathiafulvalene (TTF, an electron donor) and an anion of TCNQ (an electron acceptor), and approximately one molecule of neutral TCNQ. In the TCNQ salt, a salt is produced by moving an electron from TTF to TCNQ, and thus, the TCNQ salt is referred to as a charge transfer complex. In the crystal, each of planar TTF and TCNQ forms a laminated structure. The electrons are moved between the layers, and conductivity is exhibited.

In contrast, in organic semiconductor layer 4, high carrier mobility is expected between the molecules. The molecules of the low molecular organic semiconductor compound contained in organic semiconductor layer 4 are highly oriented, and thus, the low molecular organic semiconductor compound has high crystallinity, and it is possible to shorten the distance between the molecules forming organic semiconductor layer 4. Therefore, many portions in which the π electron clouds of the molecules of the low molecular organic semiconductor compound overlap is formed between the molecules. Thus, organic semiconductor layer 4 provides high conductivity. Meanwhile, it is difficult for the charge transfer complex (the TCNQ salt) to reach the inner portion of the pore or the etching pit since the charge transfer complex is hardly dissolved in the solvent. Accordingly, a high capacitance appearance rate is not expected.

The low molecular organic semiconductor compound is preferably a compound having at least one selected from the group consisting of condensed rings and hetero rings. A planar structure such as a condensed ring or a hetero ring in a part of the compound improves crystallinity, and makes carrier mobility high.

The compound having a condensed ring or a hetero ring is not particularly limited, examples of the compound having a condensed ring or a hetero ring include polyacenes having a structure in which a plurality of benzene rings are linearly condensed as denoted by Chemical Formula (1) and a derivative thereof, a compound having a structure in which a plurality of benzene rings are non-linearly condensed and a derivative thereof, oligothiophene in which a plurality of thiophenes are bonded as denoted by Chemical Formula (2) and a derivative thereof, thienoacene which is a thiophene-containing condensed polycyclic aromatic compound as denoted by Chemical Formulas (3) to (5) and a derivative thereof, and the like. Such a compound has a low molecular weight and improved π conjugation. Furthermore, the compound having a condensed ring or a hetero ring is not limited to the chemical formulas described below.

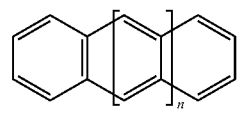

(in Chemical Formula (1), n is 1, 2, 3, or 4)

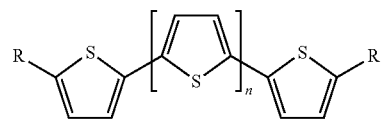

(in Chemical Formula (2), n is 0, 1, 2, 3, 4, 5, or 6, and R is H or an alkyl group)

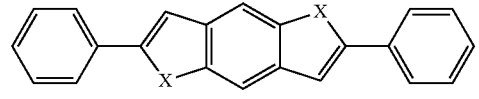

(in Chemical Formula (3), X is S, Se, or Te)

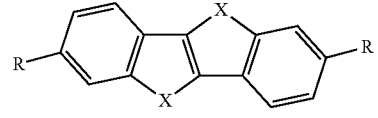

(in Chemical Formula (4), X is S or Se, and R is an alkyl group or a phenyl group)

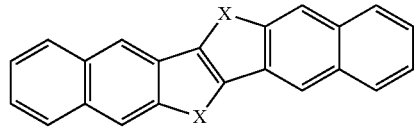

(in Chemical Formula (5), X is S or Se)

Specifically, examples of a compound having a condensed ring include anthracene, tetracene, pentacene, rubrene, picene, benzopyrene, chrysene, pyrene, triphenylene. Examples of a derivative thereof include 6,13-bis(triisopropylsilylethynyl)pentacene (TIPS-pentacene).

Examples of a compound having a hetero ring include a thiophene compound. Examples of the thiophene compound include a BTBT derivative such as 2,7-dioctylbenzothieno[3,2-b]benzothiophene (C8-BTBT), dinaphtho[2,3-b:2',3'-f]thiopheno[3,2-b]thiophene (DNTT), dianthra[2,3-b:2',3'-f]thiophen[3,2-b]thiophene (DATT), and 5,5'-bis(7-hexyl-9H-fluoren-2-yl)-2,2'-bithiophene (DHFTTF).

Examples of the other compound include tris(8-hydroxyquinolinato)aluminum (Alq3), 1,1,2,2-tetraphenyl disilane (TPDS).

It is preferable that the low molecular organic semiconductor compound is soluble in a solvent having a boiling point of 100° C. or lower. When organic semiconductor layer 4 is formed, the low molecular organic semiconductor compound or a precursor thereof is dissolved in a solvent, and the obtained solution is applied onto dielectric layer 3. After that, the solvent is removed by a heat treatment or the like, and when the boiling point of the solvent is 100° C. or lower, the solvent is easily removed. If the solvent remains, the solvent becomes a resistance component, and thus, the inner resistance increases. In addition, the solvent expands at the time of performing a reflow step for mounting the electrolytic capacitor on a circuit board, and thus, stress is applied to dielectric layer 3. As a result, a defect such as a crack may occur in the electrolytic capacitor, and thus, the leak current may increase. The conductive polymer which has been used in the related art is hardly dissolved in a solvent having a low boiling point. Accordingly, the solvent easily remains and tends to affect performance of the electrolytic capacitor.

Examples of the solvent having a boiling point of 100° C. or lower include tetrahydrofuran (THF), methanol, isopropyl alcohol, and a halogenated solvent such as trichloroethylene and chloroform.

It is preferable that the thickness of organic semiconductor layer 4 is 1 µm or less. When the thickness of organic semiconductor layer 4 is 1 µm or less, high conductivity is expected. When the thickness of organic semiconductor layer 4 is greater than 1 µm, the carrier transfer pass among the molecules becomes longer, and conductivity may be lowered.

Even when the dopant is not separately and actively added, organic semiconductor layer 4 functions as an electrolyte. This is because in a case where an electric field is applied or the like, for example, the carrier is injected into organic semiconductor layer 4 from adjacent conductive polymer layer 6, and the carrier can be transported through the π electron cloud of the low molecular organic semiconductor compound which forms organic semiconductor layer 4. Absence of the added dopant prevents film quality deterioration of organic semiconductor layer 4 due to dedoping or diffusion of the dopant, for example, from occurring, and it is possible to increase the reliability of the electrolytic capacitor.

The dopant may be added to organic semiconductor layer 4. A carrier concentration of organic semiconductor layer 4 increases by the doping, and thus, it is possible to increase conductivity of organic semiconductor layer 4. Meanwhile, even when organic semiconductor layer 4 contains the dopant, carrier movement in the molecules and between the molecules is performed through the π electron cloud of the low molecular organic semiconductor compound.

The dopant is at least one selected from the group consisting of electron donating molecules and electron accepting molecules. The dopant is not particularly limited, and examples of the dopant include tetrathiafulvalene and a TCNQ derivative such as 2,3,5,6-tetrafluoro-7,7,8,8-tetracyanoquinodimethane.

Organic semiconductor layer 4 may be formed after the surface of dielectric layer 3 is treated. The low molecular organic semiconductor compound is hydrophobic, and thus, it is preferable that the surface of dielectric layer 3 is hydrophobized in advance. Specifically, for example, organic semiconductor layer 4 can be formed after the surface of dielectric layer 3 is treated by using a silane coupling agent.

A silane coupling agent having an epoxy group, a silane coupling agent having an acrylic group, and the like are preferable as the silane coupling agent, from the viewpoint of being advantageous to a reduction in ESR or improvement of capacitance. Examples of the silane coupling agent having an epoxy group include 2-(3,4-epoxy cyclohexyl) ethyl trimethoxy silane, 3-glycidoxy propyl trimethoxy silane, 3-glycidoxy propyl methyl diethoxy silane, 3-glycidoxy propyl triethoxy silane. In addition, examples of the silane coupling agent having an acrylic group include 3-methacryloxy propyl methyl dimethoxy silane, 3-methacryloxy propyl trimethoxy silane, 3-methacryloxy propyl methyl diethoxy silane, 3-methacryloxy propyl triethoxy silane, 3-acryloxy propyl trimethoxy silane (γ-acryloxy propyl trimethoxy silane). Examples of the other silane coupling agent include vinyl trichlorosilane, vinyl trimethoxy silane, vinyl triethoxy silane, p-styryl trimethoxy silane, N-2-(aminoethyl)-3-aminopropyl methyl dimethoxy silane, N-2-(aminoethyl)-3-aminopropyl triethoxy silane, N-2-(aminoethyl)-3-aminopropyl trimethoxy silane, 3-aminopropyl trimethoxy silane, 3-aminopropyl triethoxy silane, 3-triethoxy silyl-N-(1,3-dimethyl-butylidene) propyl amine, N-phenyl-3-aminopropyl trimethoxy silane, a hydrochloride of N-(vinyl benzyl)-2-aminoethyl-3-aminopropyl trimethoxy silane, 3-ureide propyl triethoxy silane, 3-chloropropyl trimethoxy silane, 3-mercaptopropyl methyl dimethoxy silane, 3-mercaptopropyl trimethoxy silane, bis(triethoxy silyl propyl)tetrasulfide, 3-isocyanate propyl triethoxy silane. The silane coupling agent may be independently used, or two or more types thereof may be used in combination.

Conductive Polymer Layer

In this embodiment, conductive polymer layer 6 is formed on organic semiconductor layer 4. Specifically, for example, conductive polymer layer 6 can be formed by chemically polymerizing the raw material monomer on organic semiconductor layer 4. Alternatively, conductive polymer layer 6 can be formed by applying a solution in which the conductive polymer is dissolved or a dispersion in which the conductive polymer is dispersed onto organic semiconductor layer 4. The thickness of conductive polymer layer 6, for example, is 1 µm to 50 µm.

Examples of the conductive polymer include polypyrrole, polythiophene, polyfuran, polyaniline, polyacetylene, polyphenylene, polyparaphenylene vinylene, polyacene, polythiophene vinylene, polyfluorene, polyvinyl carbazole, polyvinyl phenol, polypyridine, and derivatives thereof. The conductive polymer may be independently used, or a plurality of types thereof may be used in combination. In addition, the conductive polymer may be a copolymer of two or more types of monomers. Among them, polyaniline and polypyrrole are preferable from the viewpoint of excellent solubility with respect to a solvent and excellent conductivity.

Furthermore, herein, "polypyrrole", "polythiophene", "polyfuran", "polyaniline", and the like respectively indicate a polymer including polypyrrole, polythiophene, polyfuran, polyaniline, and the like as a basic framework. Therefore, "polypyrrole", "polythiophene", "polyfuran", "polyaniline", and the like also contain derivatives thereof. For example, "polythiophene" contains poly(3,4-ethylene dioxy thiophene), and the like.

The weight average molecular weight of the conductive polymer is not particularly limited, and it is preferable that the weight average molecular weight of the conductive polymer, for example, is greater than 10,000. It is more preferable that the weight average molecular weight of the conductive polymer is greater than 10,000 and not greater than 1,000,000. Such a conductive polymer easily forms a homogeneous electrolyte layer. In addition, when the conductive polymer is dispersed in a dispersion medium in a state of particles or a powder, it is preferable that an average particle diameter D50 of the particles or the powder, for example, is 0.01 μm to 0.5 μm. Here, the average particle diameter D50 is a median diameter of a volume particle size distribution which is obtained by a laser diffraction type particle size distribution measurement device. Water or the like can be used as a solvent.

Various dopants may be added to the solution or the dispersion of the conductive polymer in order to improve conductivity of the conductive polymer. The dopant is not particularly limited, and examples of the dopant include a 1,5-naphthalene disulfonic acid, a 1,6-naphthalene disulfonic acid, a 1-octane sulfonic acid, a 1-naphthalene sulfonic acid, a 2-naphthalene sulfonic acid, a 2,6-naphthalene disulfonic acid, a 2,7-naphthalene disulfonic acid, a 2-methyl-5-isopropyl benzene sulfonic acid, a 4-octyl benzene sulfonic acid, a 4-nitrotoluene-2-sulfonic acid, an m-nitrobenzene sulfonic acid, an n-octyl sulfonic acid, an n-butane sulfonic acid, an n-hexane sulfonic acid, an o-nitrobenzene sulfonic acid, a p-ethyl benzene sulfonic acid, a trifluoromethane sulfonic acid, a hydroxy benzene sulfonic acid, a butyl naphthalene sulfonic acid, a benzene sulfonic acid, a polystyrene sulfonic acid, a polyvinyl sulfonic acid, a methane sulfonic acid. In addition, examples of the derivative thereof include a metal salt, an ammonium salt, a piperidinium salt, a pyrrolidinium salt, and a pyrrolinium salt. Examples of the metal salt include a lithium salt, a potassium salt, and a sodium salt. Examples of the ammonium salt include a methyl ammonium salt, a dimethyl ammonium salt, and a trimethyl ammonium salt.

Cathode Layer

Cathode layer 5 is so formed as to cover the surface of conductive polymer layer 6. Cathode layer 5 includes carbon layer 5*a*, and silver paste layer 5*b* formed on the surface of carbon layer 5*a*. Carbon layer 5*a* is formed of a composition containing a conductive carbon material such as graphite. Silver paste layer 5*b* is formed of a composition containing silver particles and a resin. Note that the configuration of cathode layer 5 is not limited thereto, as long as cathode layer 5 has a current-collecting function.

Thus, an anode member of capacitor element 10 is composed of anode 1 and anode lead 2, a cathode member of capacitor element 10 is composed of organic semiconductor layer 4, conductive polymer layer 6, and cathode layer 5, and a dielectric member of capacitor element 10 is composed of dielectric layer 3.

An example of a method for manufacturing an electrolytic capacitor according to this embodiment will be described.

Method for Manufacturing Electrolytic Capacitor (i) Preparation of Anode

Anode 1 including dielectric layer 3 is prepared. Specifically, dielectric layer 3 formed of an oxide film of valve action metal can be formed on the surface of anode 1 by dipping anode 1 in a transformation tub filled with an electrolytic aqueous solution (for example, an aqueous solution of a phosphoric acid), followed by connecting second end portion 2*b* of anode lead 2 to a positive electrode of the transformation tub, and anodizing anode 1. The electrolytic aqueous solution is not limited to the aqueous solution of the phosphoric acid, and a nitric acid, an acetic acid, a sulfuric acid, and the like can be used.

(ii) Hydrophobization of Dielectric Layer

This step is performed as necessary, and is performed by applying a solution containing a silane coupling agent onto dielectric layer 3, followed by drying the solution. The solvent is not particularly limited, but water or monohydric alcohol such as ethanol, propanol, and butanol can be used.

(iii) Formation of Organic Semiconductor Layer

A solution in which the low molecular organic semiconductor compound is dissolved in a solvent having a low boiling point (a boiling point of 66° C.) such as tetrahydrofuran (THF) is applied onto dielectric layer 3, the solvent is removed by a heat treatment or the like, and thus, organic semiconductor layer 4 is formed. Examples of a coating method include a method in which a solution of the low molecular organic semiconductor compound is applied onto dielectric layer 3, a method in which the unfinished capacitor element in which processes until formation of dielectric layer 3 are just finished is impregnated in a solution of the low molecular organic semiconductor compound. The low molecular organic semiconductor compound has a low molecular weight, and thus, it is possible to form organic semiconductor layer 4 on the surface of dielectric layer 3 with a high coating ratio by using a simple method of coating a solution.

It is preferable that the concentration of the solution of the low molecular organic semiconductor compound is 0.01 weight % to 5 weight %. When the concentration is in the range described above, it is possible to form an organic semiconductor layer having a sufficient thickness on the dielectric layer. The heat treatment may be performed at 100° C. to 180° C. for 1 minute to 60 minutes. It is preferable that the boiling point of the solvent in which the low molecular organic semiconductor compound is dissolved is 100° C. or lower.

Alternatively, the solution in which the precursor of the low molecular organic semiconductor compound is dissolved instead of the low molecular organic semiconductor compound may be applied onto dielectric layer 3. In this case, the heat treatment or the like is performed after coating the solution in which the precursor of the low molecular organic semiconductor compound is dissolved, and thus, the low molecular organic semiconductor compound is generated from the precursor. The precursor is a compound which generates the low molecular organic semiconductor compound by the heat treatment. For example, examples of the precursor include 13,6-N-Sulfinylacetamidopentacene (NS-FAAP) and pentacene-N-sulfinyl-tert-butylcarbamate which are precursors of pentacene.

It is also preferable that the precursor is soluble in a solvent having a boiling point of 100° C. or lower. It is preferable that the concentration of the solution of the precursor is 0.01 weight % to 5 weight %. When the concentration is in the range described above, it is possible to form organic semiconductor layer 4 having a sufficient thickness on dielectric layer 3. The heat treatment for generating the low molecular organic semiconductor compound from the precursor may be performed as a heat treatment for removing the solvent.

(iv) Formation of Conductive Polymer Layer

Conductive polymer layer 6 can be formed by a method of impregnating a monomer or an oligomer of the unfinished capacitor element in which processes until formation of organic semiconductor layer 4 are just finished, and then, of polymerizing the monomer or the oligomer by chemical polymerization or electrolytic polymerization. The concentration of the raw material monomer in the solution is, for example, 0.1 mol/L (liter) to 2.0 mol/L. Alternatively, conductive polymer layer 6 can be formed by applying a solution or a dispersion of the conductive polymer onto organic semiconductor layer 4 formed in the capacitor element, followed by drying the solution or the dispersion.

The concentration of the conductive polymer in the solution is, for example, 0.5 g/L (liter) to 6 g/L.

Note that conductive polymer layer 6 may be formed after or before organic semiconductor layer 4 is formed. In the former case, void 12 surrounded by organic semiconductor layer 4 and conductive polymer layer 6 may be formed. In the latter case, dielectric layer 3 may include a portion which is not covered with conductive polymer layer 6 but is covered with organic semiconductor layer 4, and a portion which is not covered with organic semiconductor layer 4 but is covered with conductive polymer layer 6.

Further, second conductive polymer layer 6b may be formed in addition to conductive polymer layer 6. Second conductive polymer layer 6b can be electrochemically formed by electrolytic polymerization. The electrolytic polymerization is suitable for synthesizing a thin film-like polymer. For example, the unfinished capacitor element in which processes until formation of first conductive polymer layer 6a are just finished is dipped in a solution containing a raw material monomer and a dopant, and the monomer is polymerized by allowing a current to flow through the unfinished capacitor element as an electrode or by scanning the potential of the unfinished capacitor element so that second conductive polymer layer 6b is formed. The concentration of the raw material monomer in the solution is, for example, 0.1 mol/L (liter) to 2.0 mol/L.

(v) Formation of Cathode Layer

Cathode layer 5 formed of carbon layer 5a and silver paste layer 5b can be formed by sequentially applying a carbon paste and a silver paste onto the surface of conductive polymer layer 6 (or second conductive polymer layer 6b). The configuration of cathode layer 5 is not limited thereto, as long as cathode layer 5 has a current-collecting function.

As described above, a method for manufacturing a chip type electrolytic capacitor has been described, and the method can also be directly applied to other electrolytic capacitors such as a wound electrolytic capacitor or a laminated electrolytic capacitor using a metal plate as an anode member as it is or by suitably being changed.

Second Exemplary Embodiment

Figure 3:
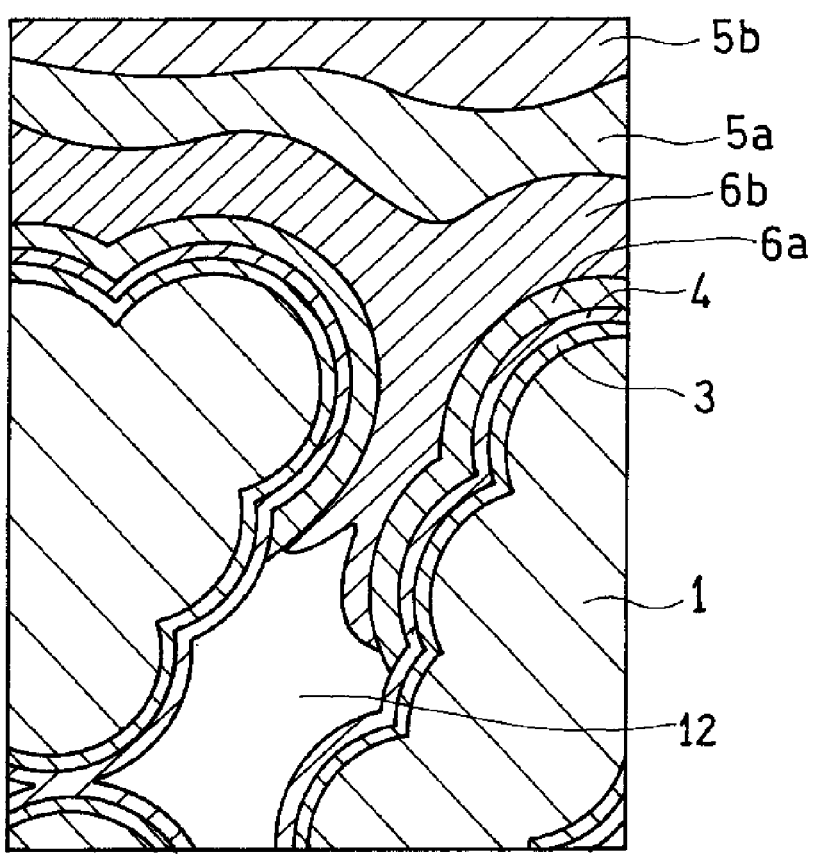
FIG. 3 is a schematic sectional view of a main part of an electrolytic capacitor according to another embodiment of the present disclosure.

Second exemplary embodiment of the present disclosure will be described with reference to FIG. 3.

In this embodiment, conductive polymer layer 6 is formed of first conductive polymer layer 6a and second conductive polymer layer 6b. First conductive polymer layer 6a covers a part of organic semiconductor layer 4. Accordingly, void 12 surrounded by organic semiconductor layer 4 and first conductive polymer layer 6a or second conductive polymer layer 6b is formed. Void 12 is formed since the conductive polymer forming first conductive polymer layer 6a or second conductive polymer layer 6b cannot have been put into a recessed portion of asperity derived from anode 1. Even in this case, organic semiconductor layer 4 is formed along the recessed portion, and thus, it is possible to improve a capacitance appearance rate, and to obtain large capacitance.

First conductive polymer layer 6a and second conductive polymer layer 6b may be formed of the same polymer, or may be formed of different polymers from each other. Similarly, even when first conductive polymer layer 6a and second conductive polymer layer 6b contain a dopant, first conductive polymer layer 6a and second conductive polymer layer 6b may contain the same dopant, or may contain different dopants from each other. First conductive polymer layer 6a can be formed by chemical polymerization, for example. Second conductive polymer layer 6b can be formed by electrolytic polymerization, for example.

Third Exemplary Embodiment

Figure 4:
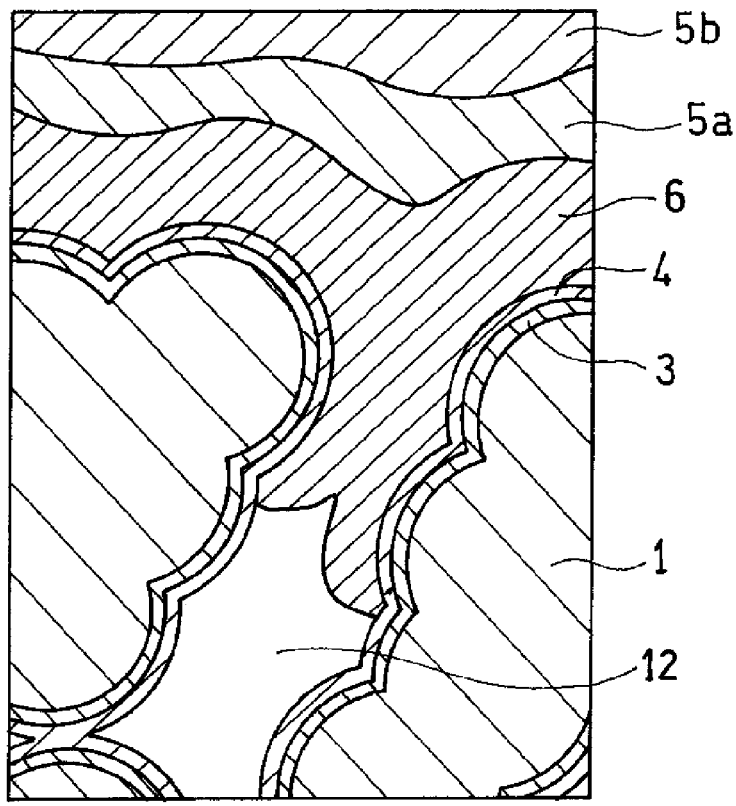
FIG. 4 is a schematic sectional view of a main part of an electrolytic capacitor according to still another embodiment of the present disclosure.

Third exemplary embodiment of the present disclosure will be described with reference to FIG. 4.

In this embodiment, conductive polymer layer 6 covers a part of organic semiconductor layer 4. Accordingly, void 12 surrounded by organic semiconductor layer 4 and conductive polymer layer 6 is formed. Void 12 is formed since the conductive polymer cannot have been put into the recessed portion of asperity derived from anode 1. Conductive polymer layer 6 of this embodiment is formed by applying a dispersion in which conductive polymer is dispersed in a dispersion medium onto organic semiconductor layer 4. Even when void 12 is formed as described above, organic semiconductor layer 4 is formed along the recessed portion, and thus, it is possible to improve a capacitance appearance rate, and to obtain large capacitance.

Fourth Exemplary Embodiment

Figure 5:
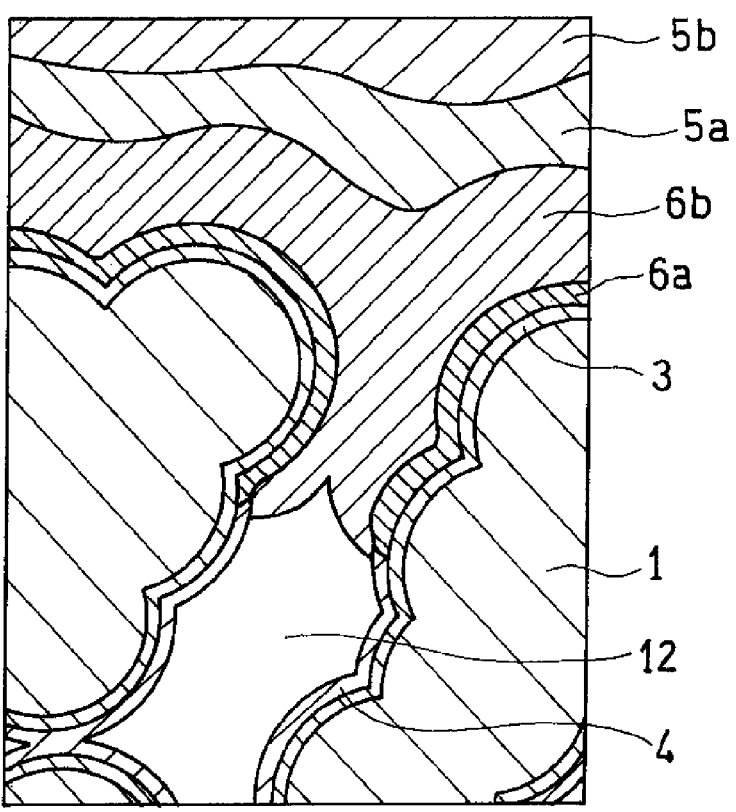
FIG. 5 is a schematic sectional view of a main part of an electrolytic capacitor according to still another embodiment of the present disclosure.

Fourth exemplary embodiment of the present disclosure will be described with reference to FIG. 5.

In this embodiment, dielectric layer 3 includes a portion which is not covered with first conductive polymer layer 6a but is covered with organic semiconductor layer 4, and a portion which is not covered with organic semiconductor layer 4 but is covered with first conductive polymer layer 6a. In this case, organic semiconductor layer 4 is formed after formation of first conductive polymer layer 6a, for example. The low molecular organic semiconductor compound applied later is put into the recessed portion on dielectric layer 3 in which first conductive polymer layer 6a is not formed, and organic semiconductor layer 4 partially in contact with dielectric layer 3 is formed. Then, second conductive polymer layer 6b is formed, but second conductive polymer layer 6b is not formed in the recessed portion on dielectric layer 3. Accordingly, void 12 surrounded by organic semiconductor layer 4 and first conductive polymer layer 6a or second conductive polymer layer 6b is formed. A portion in which conductive polymer layer 6 is not formed is covered with organic semiconductor layer 4, and thus, it is possible to improve a capacitance appearance rate, and to obtain large capacitance.

Fifth Exemplary Embodiment

An electrolytic capacitor of this embodiment includes a capacitor element of a wound body. A wound capacitor element is prepared from the wound body. The wound body is a semifinished product of a capacitor element, and includes an anode connected to a lead tab, a cathode connected to the other lead tab, and a separator. The anode and the cathode are wound together with the separator disposed therebetween. The outermost circumference of the wound body is fixed by stop tape.

The anode is a metal foil of which the surface is roughened to have asperity, and a dielectric layer is formed on the metal foil having asperity. A metal foil can also be used for the cathode as well as the anode. The type of metal is not particularly limited, and a valve action metal such as aluminum, tantalum, and niobium or an alloy containing the valve action metal is preferably used. The surface of the cathode may be roughened as necessary. Disposing an organic semiconductor layer between the anode and the cathode in the wound body allows the capacitor element to be obtained.

In this case, the organic semiconductor layer can be formed between the anode and the cathode by impregnating the wound body formed by winding the anode, the separator, and the cathode in a solution in which the low molecular organic semiconductor compound is dissolved or a solution in which the precursor of the low molecular organic semiconductor compound is dissolved. Alternatively, the organic semiconductor layer can be formed between the anode and the cathode by impregnating the anode before being wound in the solution in which the low molecular organic semiconductor compound is dissolved or the solution in which the precursor of the low molecular organic semiconductor compound is dissolved, thereby forming the organic semiconductor layer on the surface of the anode, followed by winding the anode, the separator and the cathode. In this case, the organic semiconductor layer may be similarly formed in the separator and/or the cathode before being wound.

An electrolytic solution containing an organic solvent is preferable as an electrolyte, and examples of the organic solvent include propylene glycol, sulfolane, γ-butyrolactone, ethylene glycol. Alternatively, the conductive polymer described above may be used as the electrolyte, or a solution or a dispersion of the conductive polymer containing an organic solvent may be used. When the electrolytic solution is used, a compound which is not dissolved in the electrolytic solution is preferably selected as the low molecular organic semiconductor compound.

EXAMPLES

Hereinafter, the present disclosure will be described in more detail on the basis of examples, but the present disclosure is not limited to the examples.

Example 1

A capacitor element was prepared by the following method, and the properties thereof were evaluated.
Step 1: Formation of Anode 1

Tantalum metal particles having a primary particle diameter of approximately 0.5 μm and a secondary particle diameter of approximately 100 μm were used as valve action metal. The tantalum metal particles were molded into the shape of a rectangular parallelepiped such that first end portion 2a of anode lead 2 formed of tantalum was embedded in the tantalum metal particles, and after that, a molded body was sintered in vacuum. Accordingly, anode 1 formed of a tantalum porous sintered body was obtained. Anode 1 is in the shape of a rectangular parallelepiped having a length of 4.4 mm, a width of 3.3 mm, and a thickness of 0.9 mm. Second end portion 2b of anode lead 2 was fixed in a state where second end portion 2b of anode lead 2 protruded from one surface (3.3 mm×0.9 mm) of anode 1.
Step 2: Formation of Dielectric Layer 3

Anode 1 and a part of anode lead 2 were clipped in a transformation tub filled with 0.01 weight % to 0.1 weight % of an aqueous solution of a phosphoric acid as an electrolytic aqueous solution, and second end portion 2b of anode lead 2 was connected to the positive electrode of the transformation tub. Then, as illustrated in FIG. 1, dielectric layer 3 of oxidation tantalum ($Ta_2O_5$) was formed on the surface of anode 1 and the surface of a part of anode lead 2 by performing anodization. As illustrated in FIG. 2, even dielectric layer 3 was formed on the surface (including the inner wall surface of the pore) of the porous body of anode 1 and a part of anode lead 2 by performing the anodization.
Step 3: Hydrophobization Treatment A silane coupling agent was dissolved in water, and thus, a solution of the silane coupling agent was prepared. The solution was applied onto dielectric layer 3, then dried at 100° C. for 10 minutes.
Step 4: Formation of Organic Semiconductor Layer 4

A solution (a concentration of 0.05 weight %) in which C8-BTBT denoted in Chemical Formula (6) was dissolved in THF was applied onto dielectric layer 3 which had been hydrophobized, then dried at 100° C. for 10 minutes.

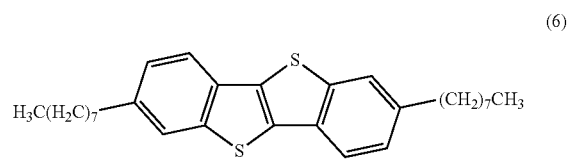

(6)

Step 5: Formation of Conductive Polymer Layer 6

An unfinished capacitor element in which processes until formation of organic semiconductor layer 4 were just finished was dipped in a solution containing a pyrrole monomer, and the pyrrole monomer was chemically polymerized, and thus, conductive polymer layer 6 was formed.
Step 6: Formation of Cathode Layer 5

A carbon paste was applied onto the surface of conductive polymer layer 6, and thus, carbon layer 5a was formed. Next, a silver paste was applied onto the surface of carbon layer 5a, and thus, silver paste layer 5b was formed. Thus, cathode layer 5 of carbon layer 5a and silver paste layer 5b was formed.
Step 7: Preparation of Electrolytic Capacitor The obtained capacitor element was sealed, and thus, an electrolytic capacitor of Example 1 illustrated in FIG. 1 was completed.

Example 2

In order to form organic semiconductor layer 4, NSFAAP (Chemical Formula (7)) which was a precursor of pentacene and F4TCNQ as a dopant of organic semiconductor layer 4 were dissolved in THF to prepare a solution. A molar ratio (NSFAAP:F4TCNQ) of NSFAAP and F4TCNQ was 1:3. The concentration of F4TCNQ was 0.5 weight %. The solution was applied onto dielectric layer 3 and dried at 100° C. for 10 minutes. Thus, pentacene as a low molecular organic semiconductor compound was generated on dielectric layer 3, so that organic semiconductor layer 4 was formed.

Except for this, an electrolytic capacitor was obtained by the same method as that in Example 1.

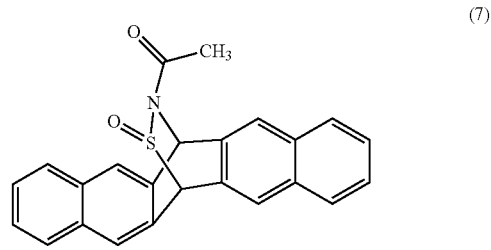 [SMILES: CC(=O)N1C2c3cc4ccccc4cc3C(c3cc4ccccc4cc32)S1=O]

(7)

Example 3

An electrolytic capacitor was obtained by the same method as that in Example 2 except that F4TCNQ was not used as a dopant of organic semiconductor layer 4.

Example 4

An electrolytic capacitor was obtained by the same method as that in Example 1 except that a conductive polymer layer containing polypyrrole was formed on dielectric layer 3 by chemical polymerization, and then, organic semiconductor layer 4 was formed, instead of a silane coupling agent treatment.

Comparative Example 1

An electrolytic capacitor was obtained by the same method as that in Example 4 except that organic semiconductor layer 4 was not formed, and second conductive polymer layer 6b containing polypyrrole was formed by electrolytic polymerization.

Evaluation

Capacitance (Electrostatic Capacity)

Capacitance was measured at an alternating current of 120 Hz by using an LCR meter.

Capacitance Appearance Rate

A capacitance appearance rate (Electrostatic Capacity/Capacitance in Water) was obtained by dividing the electrostatic capacity of the obtained electrolytic capacitor by capacitance (capacitance in water) measured by dipping an electrolytic capacitor using a capacitor element in which only a dielectric layer was formed on the anode, in an acid liquid.

Leak Current

A voltage of 6.3 V was applied between the anode and the cathode, and a leak current (LC40) after 40 seconds was measured.

Table 1 shows the evaluation results. Note that the values of Examples 1 to 4 indicate a value at the time of setting the numerical value of Comparative Example 1 to 1.000.

TABLE 1

|  | Capacitance | LC40 | Capacitance Appearance Rate |
|---|---|---|---|
| Example 1 | 1.072 | 0.579 | 1.072 |
| Example 2 | 1.071 | 0.439 | 1.071 |
| Example 3 | 1.050 | 0.626 | 1.051 |
| Example 4 | 1.082 | 0.980 | 1.082 |
| Comparative Example 1 | 1.000 | 1.000 | 1.000 |

In all of Examples 1 to 3 in which organic semiconductor layer 4 is formed on dielectric layer 3, the capacitance and the capacitance appearance rate are improved, and the leak current is reduced, compared to Comparative Example 1. In Example 4, first conductive polymer layer 6a is directly formed on dielectric layer 3, and then, organic semiconductor layer 4 and second conductive polymer layer 6b are sequentially formed. Even in this case, the capacitance appearance rate is improved, compared to Comparative Example 1. It is considered that this is because a portion on dielectric layer 3 in which first conductive polymer layer 6a has not been formed is covered with organic semiconductor layer 4 formed later.

As described above, the electrolytic capacitor of the present disclosure includes an anode, a dielectric layer formed on the anode, and an organic semiconductor layer covering at least a part of the dielectric layer. The organic semiconductor layer contains an organic semiconductor compound (hereinafter, referred to as the low molecular organic semiconductor compound) having a number average molecular weight in a range from 100 to 10,000, inclusive, and a π electron cloud. The carrier movement is performed between the molecules of the low molecular organic semiconductor compound through the π electron cloud. The low molecular organic semiconductor compound can be put into the inner wall surface of the pore or the etching pit of the dielectric layer. Accordingly, a fine portion of the dielectric layer is easily covered, and it is possible to increase capacitance of the electrolytic capacitor, compared to the conductive polymer.

At least a part of the organic semiconductor layer may be covered with the conductive polymer layer. Accordingly, it is possible to reduce ESR of the electrolytic capacitor. In this case, a void surrounded by the organic semiconductor layer and the conductive polymer layer may be provided.

In addition, the dielectric layer may include a portion which is not covered with the conductive polymer layer but is covered with the organic semiconductor layer, and a portion which is not covered with the organic semiconductor layer but is covered with the conductive polymer layer. Thanks to the structure, in the electrolytic capacitor, larger capacitance can be obtained.

It is preferable that the low molecular organic semiconductor compound has at least one selected from the group consisting of condensed rings and hetero rings. Thanks to the structure, crystallinity of the organic semiconductor layer is improved.

It is preferable that the organic semiconductor layer contains a dopant. Accordingly, conductivity of the organic semiconductor layer is improved. The dopant can be at least one selected from the group consisting of electron donating molecules and electron accepting molecules.

It is preferable that the low molecular organic semiconductor compound is soluble in a solvent having a boiling point of 100° C. or lower. Accordingly, the amount of solvent which remains in the electrolytic capacitor is easily reduced.

What is claimed is:

1. An electrolytic capacitor comprising:
   an anode;
   a dielectric layer formed on the anode;
   a conductive polymer layer formed on the dielectric layer; and
   an organic semiconductor layer covering at least a part of the dielectric layer, wherein:
   the organic semiconductor layer contains an organic semiconductor compound having a number average molecular weight in a range from 100 to 10,000, inclusive, and a π electron cloud,
   in the organic semiconductor compound, a carrier moves between molecules of the organic semiconductor compound through the π electron cloud, and
   the dielectric layer includes a first portion which is not covered with the conductive polymer layer but is covered with the organic semiconductor layer, and a second portion which is not covered with the organic semiconductor layer but is covered with the conductive polymer layer.

2. The electrolytic capacitor according to claim 1, wherein the conductive polymer layer covers at least a part of the organic semiconductor layer.

3. The electrolytic capacitor according to claim 2, wherein a void is provided so as to be surrounded by the organic semiconductor layer and the conductive polymer layer.

4. The electrolytic capacitor according to claim 1, wherein the organic semiconductor layer contains a dopant.

5. The electrolytic capacitor according to claim 4, wherein the dopant is at least one selected from the group consisting of electron donating molecules and electron accepting molecules.

6. The electrolytic capacitor according to claim 1, wherein the organic semiconductor compound is soluble in a solvent having a boiling point of lower than or equal to 100° C.

7. A method for manufacturing an electrolytic capacitor, comprising:
preparing an anode including a dielectric layer;
forming a conductive polymer layer on the dielectric layer; and
forming an organic semiconductor layer by applying a solution, in which an organic semiconductor compound having a number average molecular weight in a range from 100 to 10,000, inclusive, and a π electron cloud is dissolved, onto the surface of the dielectric layer so that the dielectric layer includes a first portion which is not covered with the conductive polymer layer but is covered with the organic semiconductor layer, and a second portion which is not covered with the organic semiconductor layer but is covered with the conductive polymer layer.

8. A method for manufacturing an electrolytic capacitor, comprising:
preparing an anode including a dielectric layer;
forming a conductive polymer layer on the dielectric layer;
applying a solution, in which a precursor of an organic semiconductor compound having a number average molecular weight in a range from 100 to 10,000, inclusive, and a π electron cloud is dissolved, onto a surface of the dielectric layer; and
generating the organic semiconductor compound from the precursor so as to form an organic semiconductor layer so that the dielectric layer includes a first portion which is not covered with the conductive polymer layer but is covered with the organic semiconductor layer, and a second portion which is not covered with the organic semiconductor layer but is covered with the conductive polymer layer.

9. An electrolytic capacitor comprising:
an anode;
a dielectric layer formed on the anode;
an organic semiconductor layer covering at least a part of the dielectric layer, wherein:
the organic semiconductor layer contains an organic semiconductor compound having a number average molecular weight in a range from 100 to 10,000, inclusive, and a π electron cloud,
in the organic semiconductor compound, a carrier moves between molecules of the organic semiconductor compound through the π electron cloud, and
the organic semiconductor compound includes at least one compound selected from the group consisting of a polyacene having a structure in which a plurality of benzene rings are linearly condensed as denoted by following chemical formula (1) and a derivative thereof, a compound having a structure in which a plurality of benzene rings are non-linearly condensed and a derivative thereof, a thienoacene, which is a thiophene-containing condensed polycyclic aromatic compound as denoted by following chemical formulas (3) to (5), and a derivative thereof,

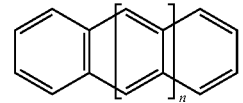

wherein in the chemical formula (1), n is 1, 2, 3, or 4,

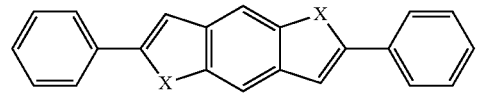

wherein in the chemical formula (3), X is S, Se, or Te,

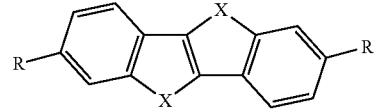

wherein in the chemical formula (4), X is S or Se, and R is an alkyl group or a phenyl group, and

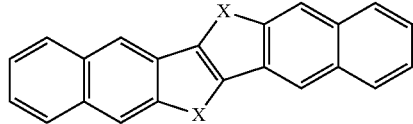

wherein in the chemical formula (5), X is S or Se.

10. The electrolytic capacitor according to claim 9, wherein the organic semiconductor layer contains a dopant.

11. The electrolytic capacitor according to claim 10, wherein the dopant is at least one selected from the group consisting of electron donating molecules and electron accepting molecules.

12. The electrolytic capacitor according to claim 9, wherein the organic semiconductor compound is soluble in a solvent having a boiling point of lower than or equal to 100° C.

13. An electrolytic capacitor comprising:
an anode;
a dielectric layer formed on the anode;
a conductive polymer layer formed on the dielectric layer; and
an organic semiconductor layer covering at least a part of the dielectric layer, wherein:
the organic semiconductor layer contains an organic semiconductor compound having a number average molecular weight in a range from 100 to 10,000, inclusive, and a π electron cloud,
in the organic semiconductor compound, a carrier moves between molecules of the organic semiconductor compound through the it electron cloud, and
a thickness of the organic semiconductor layer is smaller than a thickness of the conductive polymer layer.

14. The electrolytic capacitor according to claim 13, wherein:
the thickness of the organic semiconductor layer is equal to or less than 1 μm, and
the thickness of the conductive polymer layer is more than 1 μm and equal to or less than 50 μm.

15. The electrolytic capacitor according to claim 13, wherein the organic semiconductor layer contains a dopant.

16. The electrolytic capacitor according to claim 15, wherein the dopant is at least one selected from the group consisting of electron donating molecules and electron accepting molecules.

17. The electrolytic capacitor according to claim 13, wherein the organic semiconductor compound is soluble in a solvent having a boiling point of lower than or equal to 100° C.

\* \* \* \* \*